US010687045B2

(12) United States Patent
Krishnamurthy et al.

(10) Patent No.: US 10,687,045 B2
(45) Date of Patent: Jun. 16, 2020

(54) SYSTEMS AND METHODS FOR IDLE TIME IN COMMERCIAL TRAILER LOADING

(71) Applicant: Zebra Technologies Corporation, Lincolnshire, IL (US)

(72) Inventors: Adithya H. Krishnamurthy, Hicksville, NY (US); Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 38 days.

(21) Appl. No.: 16/168,545

(22) Filed: Oct. 23, 2018

(65) Prior Publication Data

US 2020/0128226 A1 Apr. 23, 2020

(51) Int. Cl.
| | | |
|---|---|---|
| *H04N 13/271* | (2018.01) | |
| *G06Q 10/08* | (2012.01) | |
| *B65G 67/02* | (2006.01) | |
| *G06T 15/00* | (2011.01) | |
| *H04N 13/189* | (2018.01) | |

(Continued)

(52) U.S. Cl.
CPC ........... *H04N 13/271* (2018.05); *B62D 63/08* (2013.01); *B65G 67/02* (2013.01); *B65G 67/04* (2013.01); *B65G 67/24* (2013.01); *G06Q 10/083* (2013.01); *G06Q 10/087* (2013.01);

(Continued)

(58) Field of Classification Search
CPC .............. B65G 67/02–65; G06Q 10/08; G08B 13/194; H04N 13/271
See application file for complete search history.

(56) References Cited

U.S. PATENT DOCUMENTS

| | | | | |
|---|---|---|---|---|
| 5,956,424 A | * | 9/1999 | Wootton | G08B 13/19602 340/541 |
| 9,996,818 B1 | * | 6/2018 | Ren | G06F 16/5866 |

(Continued)

FOREIGN PATENT DOCUMENTS

WO    WO-9921145 A1 *  4/1999 ....... G08B 13/19604

OTHER PUBLICATIONS

International Search Report and Written Opinion for International Application No. PCT/US2019/051225 dated Nov. 20, 2019.

(Continued)

*Primary Examiner* — Robert J Hance
(74) *Attorney, Agent, or Firm* — Yuri Astvatsaturov

(57) ABSTRACT

Three-dimensional (3D) imaging systems and methods are disclosed for analyzing idle time duration in a storage area. A 3D-depth camera non-concurrently captures frames having respective 3D image datasets. A 3D data analytics application maintains a plurality of records including a first record, associated with a 3D image dataset of a least-recent frame in a series of frames; a third record, associated with a 3D image dataset of a most-recent frame in the series of frames; and a second record, associated with a 3D image dataset of an intermediate frame captured between the least-recent frame and the most-recent frame. Based on comparisons of the first, second, and third records, an activity status type is determined defining an activity occurring within the storage area during a particular time segment. A cumulative idle time duration is incremented based on the activity status type having a non-loading status type.

20 Claims, 9 Drawing Sheets

(51) Int. Cl.
  *B62D 63/08* (2006.01)
  *B65G 67/24* (2006.01)
  *B65G 67/04* (2006.01)
  *G08B 13/194* (2006.01)

(52) U.S. Cl.
  CPC ......... *G06T 15/005* (2013.01); *H04N 13/189* (2018.05); *G08B 13/194* (2013.01)

(56) References Cited

U.S. PATENT DOCUMENTS

| | | | |
|---|---|---|---|
| 10,475,185 B1* | 11/2019 | Raghavan | G06T 7/0042 |
| 2006/0061654 A1* | 3/2006 | McKay | G08B 13/19602 |
| | | | 348/143 |
| 2006/0197664 A1 | 9/2006 | Zhang et al. | |
| 2012/0120238 A1* | 5/2012 | Adar | G08B 13/19613 |
| | | | 348/143 |
| 2014/0199142 A1* | 7/2014 | Criswell | B25J 15/00 |
| | | | 414/395 |
| 2016/0047646 A1 | 2/2016 | Ochsendorf et al. | |
| 2016/0260161 A1* | 9/2016 | Atchley | G06F 3/017 |
| 2016/0307147 A1* | 10/2016 | Jones | G06Q 10/087 |
| 2016/0332535 A1* | 11/2016 | Bradley | B60R 11/04 |
| 2017/0178333 A1* | 6/2017 | Zhang | G06Q 10/083 |
| 2017/0186124 A1 | 6/2017 | Jones et al. | |
| 2019/0197195 A1 | 6/2019 | Krishnamurthy et al. | |

OTHER PUBLICATIONS

Zeng et al., (Jun. 24, 2008). "Integrating simulation and optimization to schedule loading operations in container terminals" in Computers & Operations Research (pp. 1935-1944). Elsevier.

* cited by examiner

SYSTEMS AND METHODS FOR IDLE TIME IN COMMERCIAL TRAILER LOADING

BACKGROUND OF THE INVENTION

In the transportation industry, commercial trailers are typically loaded using a variety of different techniques that take into account a variety of different sizes and configurations of boxes, packages, or other items for shipping or transit. In addition, commercial trailers, themselves, typically have various sizes and storage capacities (e.g., where such trailers are constructed to handle different cargo sizes, loads and/or configurations). All of the various loading techniques, box sizes/configurations, and trailer sizes/configurations create various permutations of loading strategies, techniques, and differences in overall loading operations that are difficult for loaders and/or managers overseeing loading of such commercial trailers to manage.

Such various permutations of loading strategies, sizes, and configurations create problems in tracking performance or quality of loading metrics across different personnel (e.g., loaders), each of which may be located in different geographic locations and/or employ different loading regimens. In particular, loaders or managers may desire a greater understanding and improved metrics relating to the efficiency of how their trailers are loaded so that they can employ or make better management decisions to improve loading time or otherwise loading efficiency for logistical operations associated with commercial trailers. Currently, in some instances, such managers or loaders use a simple metric, e.g., the total time it takes loaders (e.g., employing different strategies) to load a commercial trailer, as measured by the total time a trailer spends at a docking bay door. However, such a metric is problematic, at least because it is deficient because it provides little insight to improve operational or loading efficiency. For example, loading managers relying on this metric typically have no knowledge of how much time is actually being spent loading the trailer, how much time the trailer sits idle at the dock door, etc.

Accordingly, there is a need for three-dimensional (3D) imaging systems and methods for analyzing idle time duration in a storage area.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
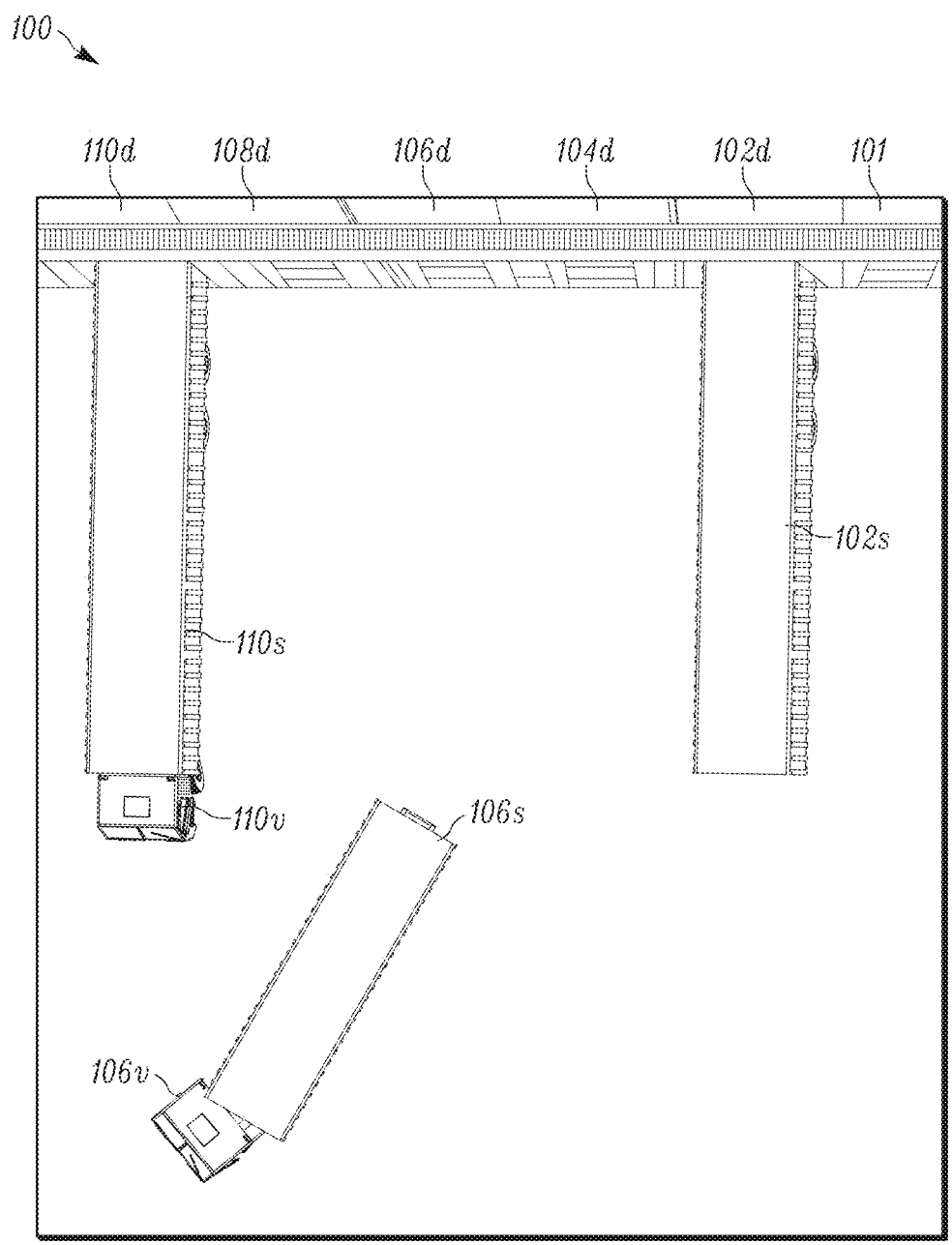
FIG. 1 is a perspective view, as seen from above, of a loading dock including a loading facility, a plurality of docking bays, a plurality of vehicles, and a plurality of vehicle storage areas, in accordance with example embodiments herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Systems and methods are disclosed herein that provide three-dimensional (3D) imaging analysis regarding idle time duration in a storage area. As described herein, idle time can include, for example, the amount of time a trailer sits at a docking bay door and is not being loaded. As a further example, idle time may measure the amount of time that boxes, packages, or other times have not been moved inside a trailer, vehicle storage area, etc. As will become apparent to those of skill in the art, the three-dimensional (3D) imaging systems and methods disclosed herein describe allow loading managers, and/or other loading personnel, to have increased visibility into their operations through the use of objective measurements (e.g., idle time metrics), allowing them to react in real-time to excessive loading inactivity, as well as analyze the overall percentage of time their trailers sit idle. With such metrics, loading managers, other loading personnel, and/or the companies or entities for which they conduct business, can make informed decisions, allowing for the processing of more parcels/packages faster and with higher efficiency. Moreover, the three-dimensional (3D) imaging systems and methods, as disclosed herein, provide robust algorithms for detecting differences between active loading, stray motion, and complete idleness. Through the detection of spatial changes between the current 3D image and several prior 3D images, the current running idle and loading times can be accurately reported in real-time. Depending on the result of the 3D image comparisons, the disclosed algorithms can make decisions as to whether loading is occurring, loading just ended, a person/individual walked in/out of a trailer/vehicle storage area, or if the trailer/vehicle storage area is sitting idle. In addition, by using specific algorithms and/or data structures (e.g., such as octrees) to organize the 3D image data, the decision making process is able to occur at fast and efficient speeds necessary to enable real-time performance and operation.

Accordingly, in various embodiments disclosed herein, three-dimensional (3D) imaging systems and methods are disclosed for analyzing idle time duration in a storage area.

The systems and methods may include non-concurrently capturing, via a 3D-depth camera, frames each having a respective 3D image dataset. In various embodiments, a 3D data analytics application (app) executing on one or more processors may maintain a plurality of records including a first record, a second record, and a third record. The first record may be associated with a 3D image dataset of a least-recent frame in a series of frames. The third record may be associated with a 3D image dataset of a most-recent frame in the series of frames. The second record may be associated with a 3D image dataset of an intermediate frame. The intermediate frame may have been captured between the least-recent frame in the series of frames and the most-recent frame in the series of frames. The three-dimensional (3D) imaging systems and methods may further include performing a first comparison between the third record and the first record to determine if a difference between the 3D image dataset associated with the third record and the 3D image dataset associated with the first record is less than or greater than a first threshold value. The three-dimensional (3D) imaging systems and methods may further include performing a second comparison between the third record and the second record to determine if a difference between the 3D image dataset associated with the third record and the 3D image dataset associated with the second record is less than or greater than a second threshold value. The three-dimensional (3D) imaging systems and methods may further include determining, based on the first comparison and the second comparison, an activity status type defining an activity occurring within the storage area during a time segment, the time segment occurring between a time of capture of the least-recent frame in the series of frames and a time of capture of the most-recent frame in the series of frames. The three-dimensional (3D) imaging systems and methods may further include incrementing, based on the activity status type having a non-loading status type, a cumulative idle time duration. The three-dimensional (3D) imaging systems and methods may further include providing, via a computer network, the cumulative idle time duration to a computing device having a computing device memory.

FIG. 1 is a perspective view, as seen from above, of a loading dock 100 including a loading facility 101, a plurality of docking bays 102d-110d, a plurality of vehicles 106v and 110v, and a plurality of vehicle storage areas 102s, 106s, and 110s, in accordance with example embodiments herein. In some embodiments, loading dock 100 may, for example, be associated with a retail store, a wholesale store, or other such commercial building. In other embodiments, loading dock 100 may be associated with a storage facility, or waypoint facility, for housing packages, boxes, or other transportable objects or goods typically involved in distribution and logistics of such transportable objects or goods. Additional embodiments are contemplated herein such that loading dock 100 accommodates the loading and unloading of transportable objects or goods at a store, a facility, or other such similar location.

For example, FIG. 1 depicts loading facility 101, which, as described, may be a retail store, a storage facility, or other such similar location that accommodates the loading and unloading of transportable objects or goods. Loading facility 101 includes a plurality of docking bays 102d-110d. For example, docking bay 104d is depicted as undocked, and includes an opening of a size equal to or similar to that of an opening of a vehicle storage area. As depicted in FIG. 1, docking bay 104d may receive a trailer (e.g., a vehicle storage area) against the wall of the loading facility 101. Docking bay 104d may further include a retractable door positioned within the opening of docking bay 104d, where the door may be opened to provide access to the vehicle storage area of a trailer from the loading facility 101. As described herein, docking bay 104d is representative of the remaining depicted docking bays, such as docking bays 102d, 106d, 108d, and 110d, where docking bays 102d, 106d, 108d, and 110d may have similar features or functionality as described herein for docking bay 104d.

In various embodiments, an opening of a vehicle storage area may be the opening of a trailer, where the trailer may be hauled by a semi, tractor-trailer, truck, or other such vehicle capable of hitching and moving a trailer (e.g., vehicle storage area), as described herein. In some embodiments the floor of a trailer, when docked, may be flush, or approximately flush, with the floor of a docking bay (e.g., docking bays 102d-110d) of loading facility 101.

FIG. 1 also depicts a plurality of vehicle storage areas 102s, 106s, and 110s. Vehicle storage areas 102s, 106s, and 110s may each be storage areas associated with a vehicle, for example, a trailer or other transportable storage area (e.g., 102s, 106s, and 110s) associated with a semi, tractor-trailer, truck, or other such large vehicle (e.g., 106v and 110v) as described herein. For example, as shown in FIG. 1, each of the vehicles 106v and 110v are associated with vehicle storage areas 106s and 110s respectively. Each of the vehicles 106v and 110v may be responsible for maneuvering their respective vehicle storage areas 106s and 110s to respective docking bays, such as docketing bays 106d and 110d.

Each of the vehicle storage areas 102s, 106s, and 110s include openings, generally at one end, that are of the same or similar size to the openings of the docking bays 102d-110d. In this way, the vehicle storage areas 102s, 106s, and 110s may interface with, or dock with, the docking bays 102d-110d in order to accommodate the loading and unloading of packages, boxes, or other transportable objects or goods as described herein. For example, as shown in FIG. 1, vehicle storage area 102s is depicted as a trailer that is docked with docking bay 102d. Accordingly, the opening of vehicle storage area 102s interfaces with the opening of docking bay 102d such that the interior of vehicle storage area 102s may be viewed or accessed from docking bay 102d. Similarly, vehicle storage area 110s is also depicted as a trailer that is docked with docking bay 110d, where the opening of vehicle storage area 110s interfaces with the opening of docking bay 110d such that the interior of vehicle storage area 110s may be viewed or accessed from docking bay 110d. Vehicle storage area 106s is depicted as currently not docked with respect to docking bay 106d.

Vehicle storage areas, such as 102s, 106s, and 110s, may have different sizes, lengths, or otherwise dimensions. For example, in one embodiment, the vehicle storage area 102s may be associated with a 63 foot long trailer, vehicle storage area may be associated with a 53 foot long trailer, and vehicle storage area 110s may be associated with a 73 foot long trailer. Other variations of vehicle storage area dimensions, sizes, and/or lengths are contemplated herein. As described herein, vehicle storage areas (e.g., 102, 106s, 110s) may be associated with vehicles 106v and 110v, which may be delivery trucks or other similar vehicles.

Figure 2A:
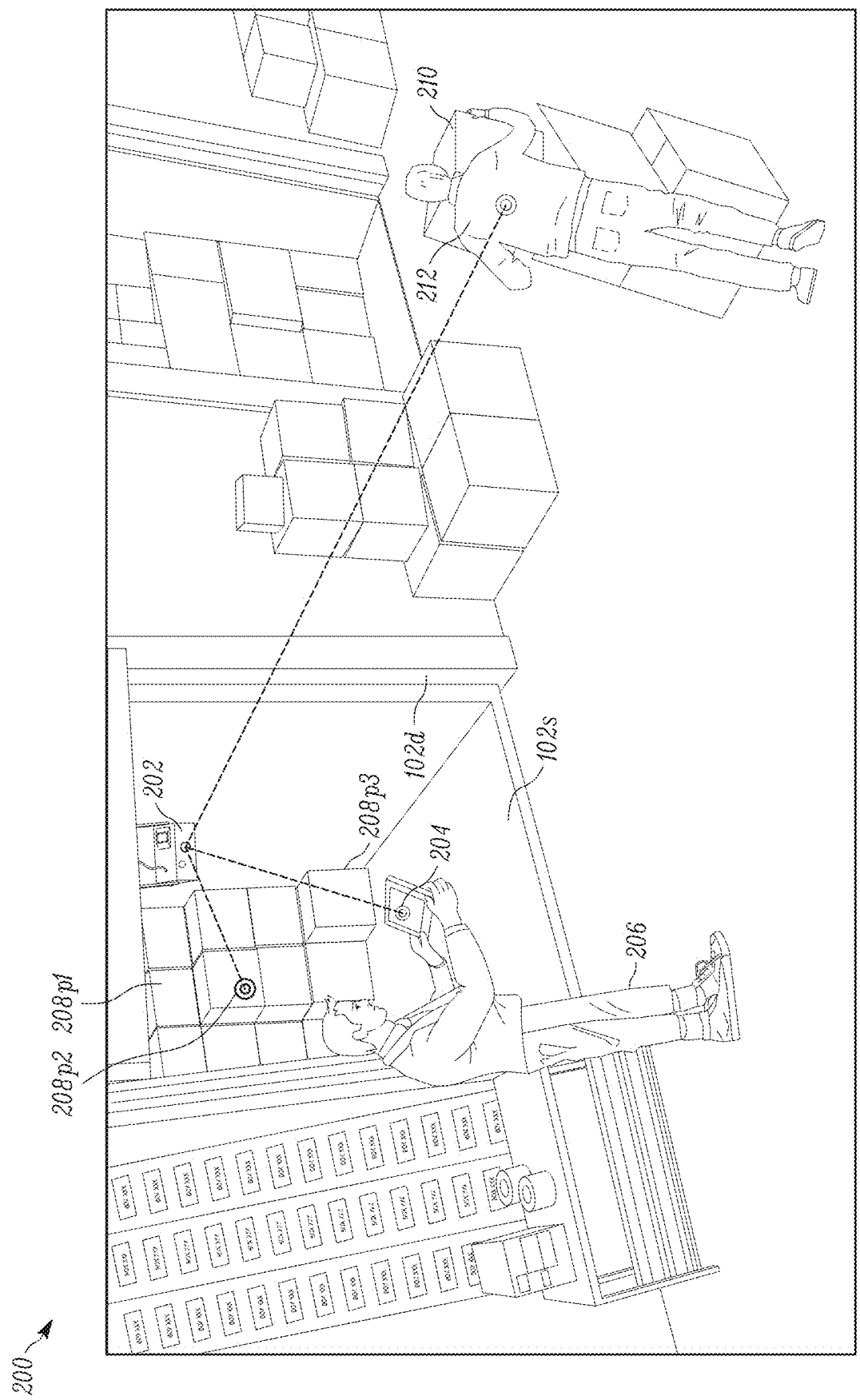
FIG. 2A is a perspective view of the loading facility of FIG. 1 depicting a vehicle storage area docked at a docking bay, in accordance with example embodiments herein.

FIG. 2A is a perspective view 200 of the loading facility 101 of FIG. 1 depicting vehicle storage area 102s docked at a docking bay 102d, in accordance with example embodiments herein. For example, FIG. 2A depicts vehicle storage area 102s, which in the embodiment of FIG. 2A is an interior view of the vehicle storage area 102s of FIG. 1. FIG. 2A also depicts docking bay 102d, which in the embodiment of FIG. 2A is an interior view of the docking bay 102d of FIG. 1. As depicted in FIG. 2A, vehicle storage area 102s is docked with docking bay 102d exposing the interior of vehicle storage area 102s to the interior of loading facility 101. Vehicle storage area 102s includes packages, boxes, and/or other transportable objects or goods, including packages 208p1-208p3, which may, in some embodiments, correspond to package walls, as described herein. The packages 208p1-208p3 may be in a state of being loaded or unloaded into vehicle storage area 102s. For example, worker 212 may be in a state of loading or unloading additional packages 210 into or out of vehicle storage area 102s. In some embodiments, manager 206 may oversee, assist, or otherwise additionally facilitate the loading or unloading packages, boxes, and/or other transportable objects or goods (e.g., packages 208p1-208p3 or 210) into or out of the vehicle storage area 102s. For example, manager 206 may utilize a dashboard app executing on client device 204 as described herein.

FIG. 2A also depicts a trailer monitoring unit (TMU) 202. TMU 202 may be a mountable device that includes a 3D-depth camera for capturing 3D images (e.g., 3D image data/datasets) and a photo-realistic camera (e.g., 2D image data/datasets). The photo-realistic camera may be an RGB (red, green, blue) camera for capturing 2D images. The TMU 202 may also include one or more processors and one or more computer memories for storing image data, and/or for executing apps that perform analytics or other functions as described herein. In various embodiments, and as shown in FIG. 2A, the TMU 202 may be mounted within loading facility 101 and oriented in the direction of vehicle storage area 102s to capture 3D and/or 2D image data of the interior of vehicle storage area 102s. For example, as shown in FIG. 2A, TMU 202 may be oriented such that the 3D and 2D cameras of TMU 202 look down the length of the vehicle storage area 102s so that TMU 202 may scan or sense the walls, floor, ceiling, packages (e.g., 208p1-208p3 or 210), or other objects or surfaces with vehicle storage area 102s to determine the 3D and 2D image data. The image data may be processed by the one or more processors and/or memories of the TMU 202 (or, in some embodiments, one or more remote processors and/or memories of a server) to implement analysis, functions, such as graphical or imaging analytics, as described by the one or more various flowcharts, block diagrams, methods, functions, or various embodiments herein. It should be noted that TMU 202 may capture 3D and/or 2D image data/datasets of a variety of storage areas, such that additional storage areas (e.g., warehouses, etc.) in addition to the vehicle storage areas are contemplated herein.

In some embodiments, for example, the TMU 202 may process the 3D and 2D image data/datasets, as scanned or sensed from the 3D-depth camera and photo-realistic camera, for use by other devices (e.g., client device 204 or server 301, as further described herein). For example, the one or more processors and/or one or more memories of the TMU 202 may process the image data/datasets scanned or sensed from vehicle storage area 102s. The processing of the image data may generate post-scanning data that may include metadata, simplified data, normalized data, result data, status data, or alert data as determined from the original scanned or sensed image data. In some embodiments, the image data and/or the post-scanning data may be sent to a client device/client application, such as a dashboard application (app) described herein, for viewing, manipulation, or otherwise interaction. In other embodiments, the image data and/or the post-scanning data may be sent to a server (e.g., server 301 as further described herein) for storage or for further manipulation.

As shown in FIG. 2A, the image data/dataset and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208p1-208p3 or 210), as described herein. In some embodiments, dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, e.g., client device 204.

In some embodiments, the dashboard app may receive the image data/datasets and/or the post-scanning data and display such data in real-time. Client device 204 may be a mobile device, such as a tablet, smartphone, laptop, or other such mobile computing device. Client device 204 may implement an operating system or platform for executing the dashboard (or other) apps or functionality, including, for example, any of the Apple iOS platform, the Google Android platform, and/or the Microsoft Windows platform. Client device 204 may include one or more processors and/or one or more memories implementing the dashboard app or for providing other similar functionality. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server or server, such as server 301 described herein. In such embodiments, the server or servers may generate post-scanning data, that may include metadata, simplified data, normalized data, result data, status data, or alert data as determined from the original scanned or sensed image data provided by the TMU 202. As described herein, the server or other centralized processing unit and/or storage may store such data, and may also send the image data and/or the post-scanning data to a dashboard app, or other app, implemented on a client device, such as the dashboard app implemented on client device 204 of FIG. 2A.

Figure 2B:
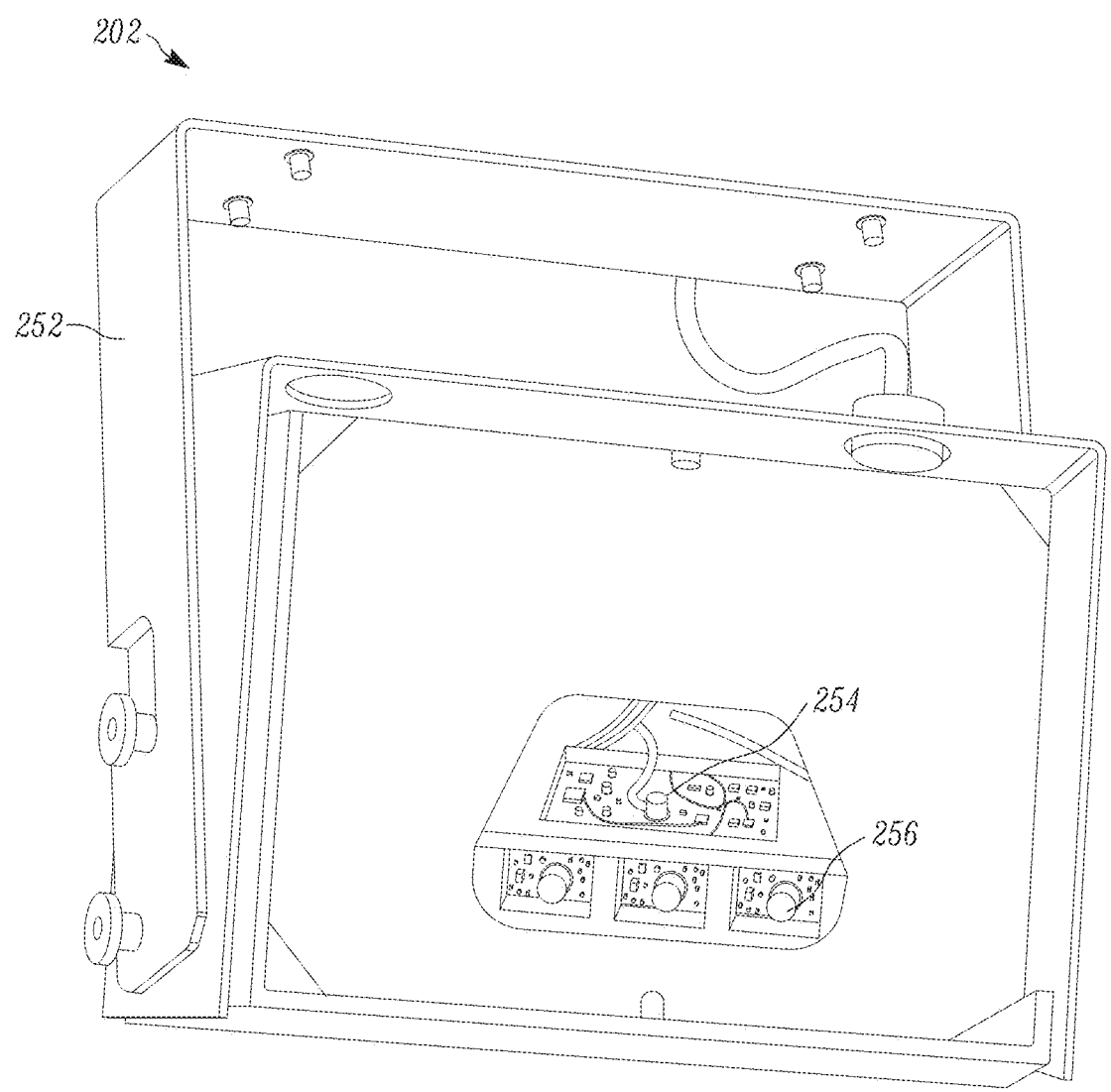
FIG. 2B is a perspective view of a trailer monitoring unit (TMU) of FIG. 2A, in accordance with example embodiments herein.

FIG. 2B is a perspective view of the TMU 202 of FIG. 2A, in accordance with example embodiments herein. In the example embodiment of FIG. 2B, TMU 202 may include a mounting bracket 252 for orienting or otherwise positioning the TMU 202 within loading facility 101 as described herein. The TMU 202 may further include one or more processors and one or more memories for processing image data as described herein. For example, the TMU 202 may include flash memory used for determining, storing, or otherwise processing the imaging data/datasets and/or post-scanning data. In addition, TMU 202 may further include a network interface to enable communication with other devices (such as server 301 of FIG. 3 as described herein). The network interface of TMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications.

TMU 202 may include a 3D-depth camera 254 for capturing, sensing, or scanning 3D image data/datasets. For example, in some embodiments, the 3D-depth camera 254 may include an Infra-Red (IR) projector and a related IR camera. In such embodiments, the IR projector projects a pattern of IR light or beams onto an object or surface, which, in various embodiments herein, may include surfaces of a vehicle storage area (e.g., vehicle storage area 102s) or objects within the vehicle storage area, such as boxes or packages (e.g., packages 208p1-208p3 or 210). The IR light or beams may be distributed on the object or surface in a pattern of dots or points by the IR projector, which may be sensed or scanned by the IR camera. A depth-detection app, such as a depth-detection app executing on the one or more processors or memories of TMU 202, can determine, based on the pattern of dots or points, various depth values, for example, depth values of vehicle storage area 102s. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or TMU 202 to generate a depth map. The depth map may represent a 3D image of, or contain 3D image data of, the objects or surfaces that were sensed or scanned by the 3D-depth camera 254, for example, the vehicle storage area 102s and any objects or surfaces therein.

The TMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D-depth camera 254 such that the TMU 202 can have both sets of 3D image data and 2D image data available for a particular surface, object, or scene at the same or similar instance in time.

Figure 3:
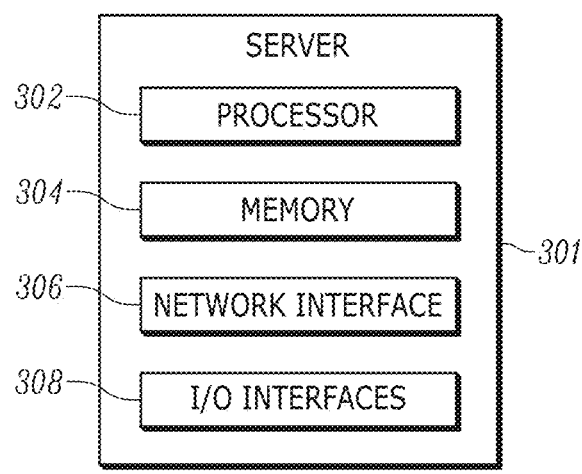
FIG. 3 is a block diagram representative of an embodiment of a server associated with the loading facility of FIG. 2A and the TMU of FIG. 2B.

FIG. 3 is a block diagram representative of an embodiment of a server associated with the loading facility 101 of FIG. 2A. In some embodiments, server 301 may be located in the same facility as loading facility 101. In other embodiments, server 301 may be located at a remote location, such as on a cloud-platform or other remote location. In either embodiment, server 301 may be communicatively coupled to a 3D-depth camera (e.g., TMU 202).

Server 301 is configured to execute computer instructions to perform operations associated with the systems and methods as described herein, for example, implement the example operations represented by the block diagrams or flowcharts of the drawings accompanying this description. The server 301 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used. As described below, the server 301 may be specifically configured for performing operations represented by the block diagrams or flowcharts of the drawings described herein.

The example server 301 of FIG. 3 includes a processor 302, such as, for example, one or more microprocessors, controllers, and/or any suitable type of processor. The example server 301 of FIG. 3 further includes memory (e.g., volatile memory or non-volatile memory) 304 accessible by the processor 302, for example, via a memory controller (not shown). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon.

The example server 301 of FIG. 3 may further include a network interface 306 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 301 of FIG. 3 includes input/output (I/O) interfaces 308 to enable receipt of user input and communication of output data to the user, which may include, for example, any number of keyboards, mice, USB drives, optical drives, screens, touchscreens, etc.

Figure 4A:
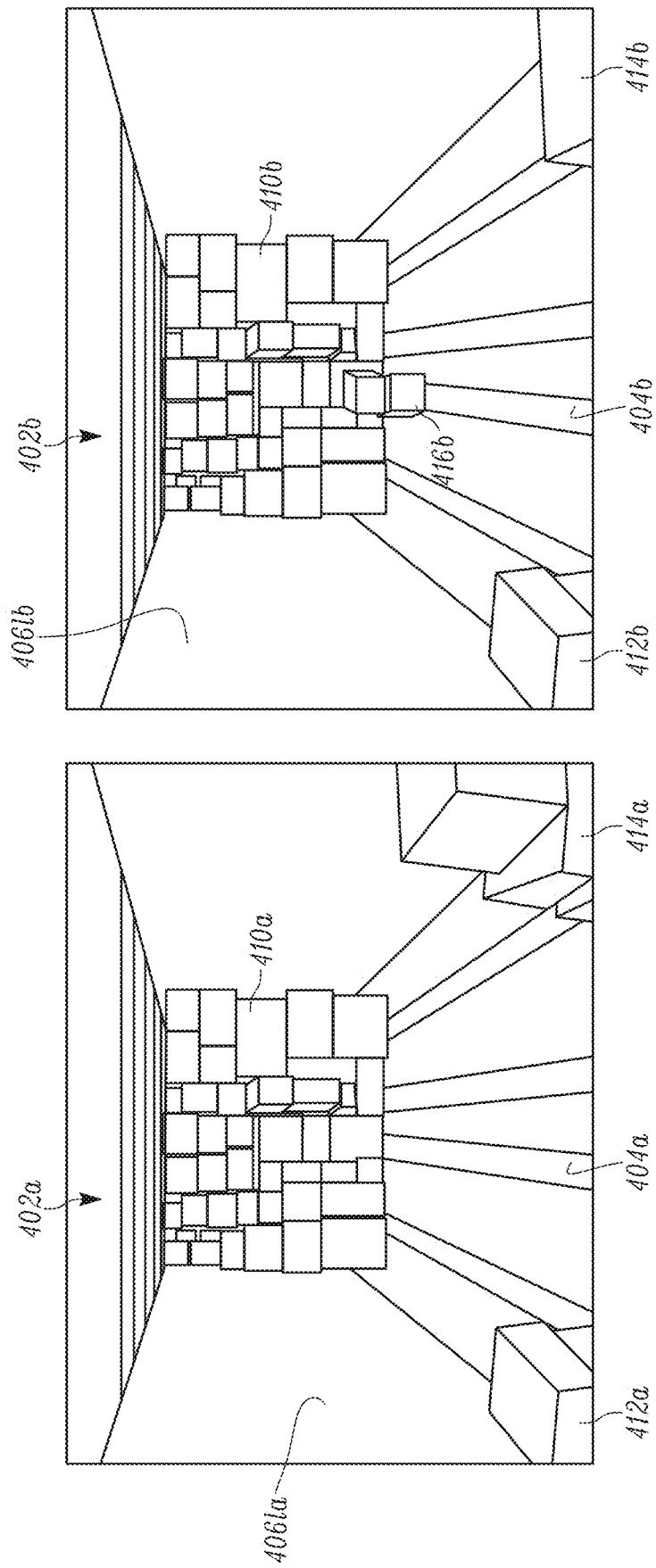
FIG. 4A illustrates a first set of photo-realistic frames depicting a first embodiment of the vehicle storage area docked at the docking bay of FIG. 2A.

FIG. 4A illustrates a first set of photo-realistic frames 402a and 402b depicting an embodiment of the vehicle storage area docked at the docking bay of FIG. 2A. In particular, each of frame 402a and frame 402b represents respective 2D (RGB) images of the vehicle storage area docked at the docking bay of FIG. 2A. In various embodiments, frames 402a and 402b may have been captured by TMU 202, e.g., by the photo-realistic camera 256 of TMU 202 as described herein. In addition, frames 402a and 402b may each include 2D image data, such as pixel data or RGB data as described herein.

Frame 402a depicts certain surface areas of the vehicle storage area that define the vehicle storage area, including left wall 406la and floor 404a of the vehicle storage area. Frame 402a also depicts various items, including packages, loaded into the vehicle storage area. These include package wall 410a, packages 412a and packages 414a. As used herein, a package wall may be a stack of packages, boxes, or other transportable objects or goods typically involved in distribution and logistics. A package wall may also be a single package that forms the foundation of a new package wall. Each of the packages, boxes, or other transportable objects or goods that make up a particular package wall may share a common depth, dimension, or length such that the particular package wall, as a whole, contains at least one uniform or approximately uniform depth, dimension, or length.

Frame 402b represents the same vehicle storage area as depicted in frame 402a, but at a different time. For example, frame 402b may represent the 2D (RGB) image of the vehicle storage area of frame 402a, but at a future time where packages 414a have been moved, as shown via packages 414b and packages 416b. For example, packages 416b may represent a portion of packages 414a that have been moved to form a new or additional package wall. All other items, in the example of FIG. 4A, may have remained the same between frames 402*a* and 402*b*, where wall 406*lb*, floor 404*b*, package wall 410*b*, packages 412*b* of frame 402*b* correspond to wall 406*la*, floor 404*a*, package wall 410*a*, packages 412*a* of frame 402*a*, respectively.

Figure 4B:
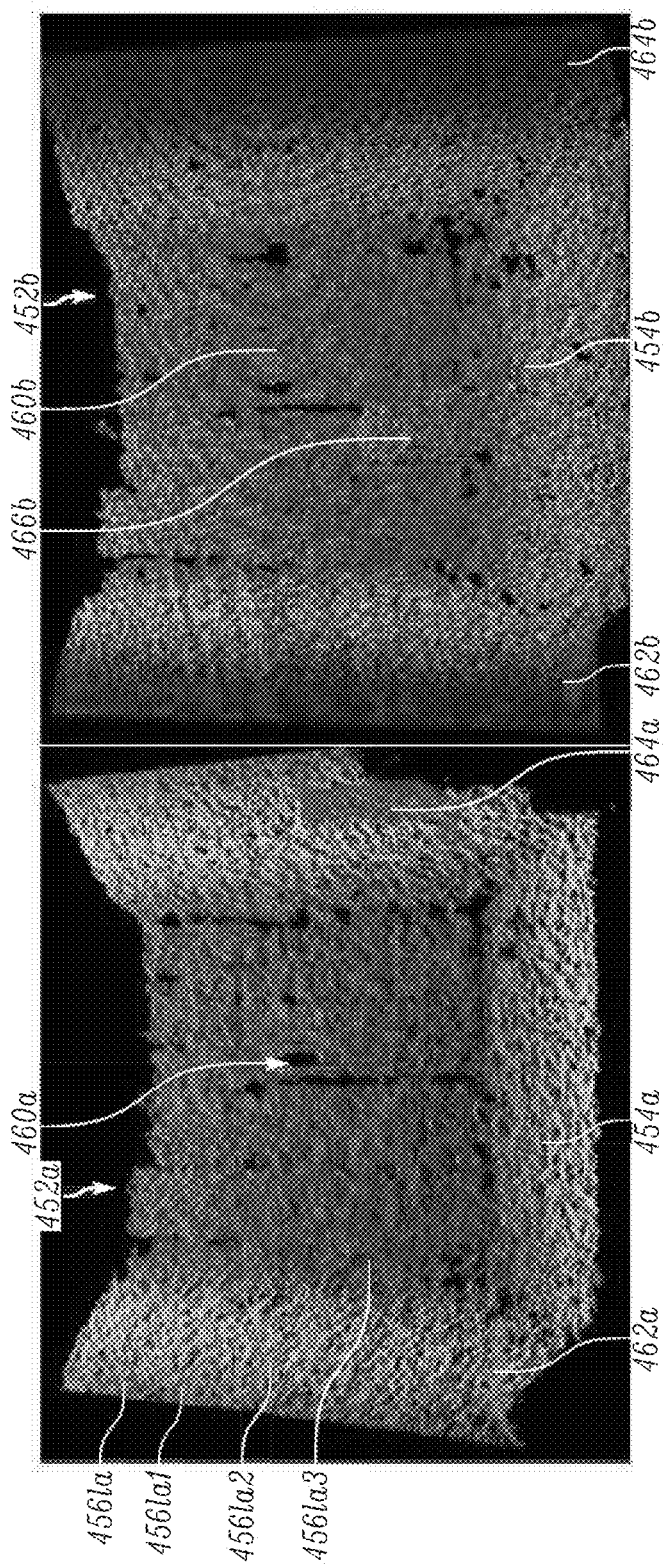
FIG. 4B illustrates depth-map renderings corresponding to the first set of photo-realistic frames of FIG. 4A.

FIG. 4B illustrates depth-map renderings corresponding to the first set of photo-realistic frames of FIG. 4A. Frames 452*a* and 452*b* of FIG. 4B represent 3D image data/datasets that correspond to 2D frames 402*a* and 402*b*, respectively. Depth-map renderings illustrated by frames 452*a* and 452*b* depict 3D images having 3D image data/datasets, of the vehicle storage area 102*s* docked at the docking bay 102*d* of FIG. 2A where the storage area includes a detected package wall (e.g., package wall 410*a* or 410*b*). Frames 452*a* and 452*b* include depth-map renderings rendered as 3D images as captured, for example, by 3D-depth camera 254 of TMU 202. Depth-map renderings of frames 452*a* and 452*b* may include 3D image data/datasets, such as depth values determined from a depth-map as described herein. The 3D image data may be point cloud data, where the point cloud data is associated with various color pixel values based on depths of the data points within depth-map renderings of frames 452*a* and 452*b* as described herein. For example, point cloud data may include a set of data points that can represent depth, distances, and the 3D shape of surfaces or objects scanned by a 3D-depth camera.

Depth-map renderings of frames 452*a* and 452*b* include the same or similar surfaces and objects as photo-realistic views of frames 402*a* and 402*b*, except the depth-map rendering of frames 452*a* and 452*b* represent such surfaces and objects via 3D imagery and/or data. For example, depth-map rendering of frames 452*a* and 452*b* includes package walls 460*a* and 460*b* that correspond to package walls 410*a* and 410*b* (but are represented in via 3D imagery and/or data). For example, as for package walls 410*a* and 410*b* of photo-realistic views of frames 402*a* and 402*b*, package walls 460*a* and 460*b* of depth-map renderings of frames 452*a* and 452*b* are also located at the rear section of the vehicle storage area 102*s*. Similarly, vehicle storage area 102*s* is defined by surface areas including left wall 406*la*/406*lb*, and floor area 404*a*/404*b* of depth-map renderings of frames 452*a* and 452*b*, which correspond to left wall 456*la*, and floor area 454*a*/454*b* of photo-realistic views of frames 402*a* and 402*b*.

Depth-map renderings of frames 452*a* and 452*b* represent various depth values of the 3D image data via different color pixel values. For example, frame 452*a* depicts an embodiment of a point cloud rendering of the vehicle storage area 102*s*, where the points of the point cloud are colored based on z-axis depth. Similarly, frame 452*b* depicts an embodiment of a point cloud rendering of the vehicle storage area 102*s*, where the points of the point cloud are colored based on z-axis depth, but where boxes have been moved (as similarly described for corresponding RGB frame 402*b*).

In the embodiment shown in FIG. 4B, an example color rendering scheme may represent depth values via different color pixels (e.g., different RGB pixel values) where the depth-map rendering of frames 452*a* and 452*b* display nearer distances (e.g., smaller depth values) in warmer colors, but displays further distances (e.g., larger depth values) in cooler colors. For example, as shown in depth-map renderings of frames 452*a* and 452*b*, the warm colors red, orange, and yellow may represent near depth values, but the cool colors green, cyan, and blue may represent far depth values. In some embodiments, each of the color values (e.g., each of several color pixels defined by RGB values) of depth-map renderings of frames 452*a* and 452*b* may represent a unique depth value. For example, a pixel having a red-toned color (RGB values: 255, 0, 0) may represent a nearer distance (e.g., 5 feet from the 3D-depth camera), but a blue-toned color (RGB values: 0, 0, 255) may represent a further distance (e.g., 27 feet from the 3D-depth camera). Black or dark regions or areas represent regions that the 3D-depth camera did not read or sense. Such regions are referred to herein as void data regions.

As shown in the embodiment of FIG. 4B, left wall 456*la* of depth-map rendering of frame 452*a* is shown in a plurality of colors representing the various depths or distances of left wall 456*la* from the 3D-depth camera (e.g., the 3D-depth camera 254) along the distance of the vehicle storage area 102*s*. As shown, the nearest portion 456*la*1 of left wall 456*la* is shown in red and/or orange pixels (e.g., red and/or orange pixels may represent distances of 1 to 10 feet), the second nearest portion 456*la*2 is shown in yellow pixels (e.g., yellow pixels may represent distances of 10 to 15 feet), and the next nearest portion 456*la*3 is shown green pixels (e.g., green pixels may represent distances of 15 to 20 feet). For example, as shown in depth-map rendering of frame 452*a*, package wall 460*a* is depicted in green pixels because it was detected between 20-25 feet from the 3D-depth camera (e.g., the 3D-depth camera 254). As the left wall 456*la*, the right wall of vehicle storage area 102*s* is rendered with the same or similar colors down the length of right wall. It is to be understood that frame 452*b* is rendered with the same color/distance algorithm as described for frame 452*a*.

In will be understood that although described in the various embodiments herein, 3D-depth camera (e.g., the 3D-depth camera 254) is cable of detecting more precise distances than 2.5 or 5 foot increments. For example, 3D-depth camera may detect distances or depths of objects or surfaces as spaced inches or fractions of inches from one another. In addition, as described above, each pixel may represent a unique distance via RGB values such that any permutation of the RGB value spectrum, which includes RGB values (R: 0 to 255, G: 0 to 255, B: 0 to 255), may represent a unique depth value in the depth-map renderings of frames 452*a* and 452*b*, which, in the given embodiments of depth-map renderings of frames 452*a* and 452*b*, can represent over 16 million unique depth values for unique distances or depths for objects or surfaces within vehicle storage area 102*s*.

As further shown in depth-map renderings of frames 452*a* and 452*b*, each of floor area 454*a*/454*b*, and packages 462*a*/462*b*, 464*a*/464*b*, 466*b* are depicted with red, orange and/or yellow-based depth values (e.g., near distances) from the 3D-depth camera (e.g., 3D-depth camera 254). Floor areas 454*a*/454*b* of FIG. 4B correspond to floor areas 404*a*/404*b* of FIG. 4A, packages 462*a*/462*b* of FIG. 4B correspond to packages 412*a*/412*b* of FIG. 4A, and packages 464*a*/464*b* of FIG. 4B correspond to packages 414*a*/414*b* of FIG. 4A. Package 466*b* of FIG. 4B corresponds to package 416*b* FIG. 4A.

Figure 5A:
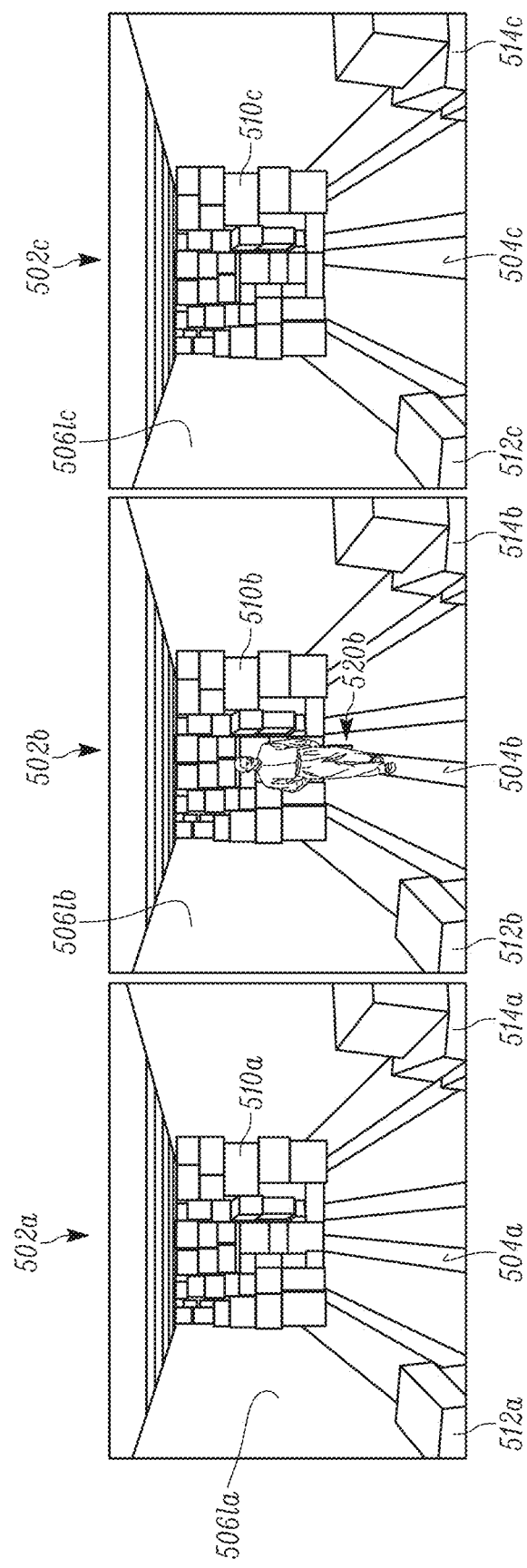
FIG. 5A is a second set of photo-realistic frames depicting a second embodiment of the vehicle storage area docked at the docking bay of FIG. 2A.

FIG. 5A is a second set of photo-realistic frames 502*a*, 502*b*, and 502*c* depicting a second embodiment of the vehicle storage area docked at the docking bay of FIG. 2A. In particular, each of frames 502*a*, 502*b*, and 502*c* represent a respective 2D (RGB) image of the vehicle storage area docked at the docking bay of FIG. 2A. Frames 502*a*, 502*b*, and 502*c* may have been captured by TMU 202, e.g., by the photo-realistic camera 256 of TMU 202 as described herein. Frames 502*a*, 502*b*, and 502*c* may each include 2D image data, such as pixel data or RGB data as described herein. In the embodiment of FIG. 5A, frame 502*a* represents a 2D image of a vehicle storage area before a person enters the vehicle storage area. Frame 502*a* depicts certain surface areas of the vehicle storage area that define the vehicle storage area, including left wall 506*la* and floor 504*a* of the vehicle storage area. Frame 502*a* also depicts various items, including packages, loaded into the vehicle storage area. These include package wall 510*a*, packages 512*a* and packages 514*a*.

Each of frames 502*b* and 502*c* represent the same vehicle storage area as depicted in frame 502*a*, but at different times. For example, frame 502*b* may represent the 2D (RGB) image of the vehicle storage area of frame 502*a*, but at a future time where person 520*b* has entered the vehicle storage area. Similarly, frame 502*c* may represent the 2D (RGB) image of the vehicle storage area of frames 502*a* and 502*b*, but at a still future time where person 520*b* has exited the vehicle storage area. In some embodiments—such as in the example of FIG. 4A, all other items may have remained the same, or substantially the same, between frames 502*a*, 502*b*, and 502*c*, where walls 506*la*/506*lb*/506*lc*, floors 504*a*/504*b*/504*c*, package walls 510*a*/510*b*/510*c*, packages 512*a*/512*b*/512*c*, and packages 514*a*/514*b*/514*c* correspond to one another, respectively, across photo-realistic frames 502*a*, 502*b*, and 502*c*, but at different times, of the vehicle storage area. However, in other embodiments, some items (e.g., especially those items including and/or comprised of moveable good) need not have remained the same, or static, between the frames (e.g., between frames 502*a*, 502*b*, and 502*c*). It is to be understood that the disclosure with respect to the photo-realistic images, related frames, views, data/datasets, or otherwise as disclosed for FIG. 4A applies equally herein for the photo-realistic images, and related frames, views, data/datasets, or otherwise of FIG. 5A.

Figure 5B:
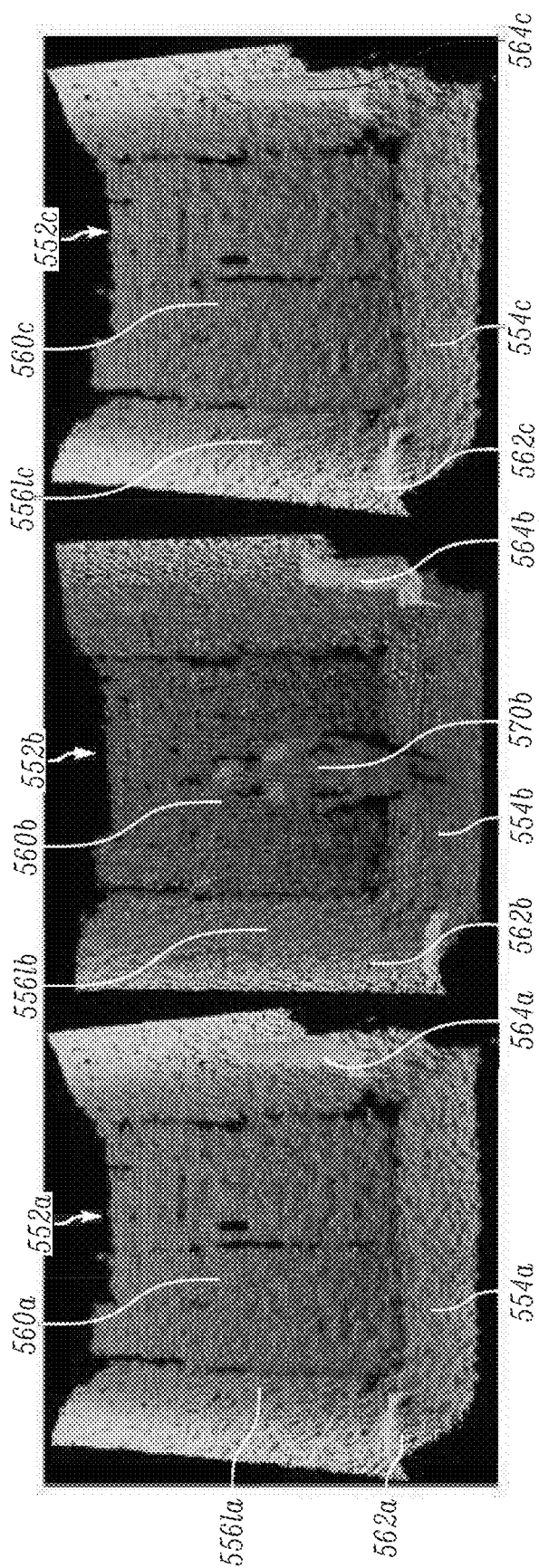
FIG. 5B illustrates depth-map renderings of the second set of photo-realistic frames of FIG. 5A.

FIG. 5B illustrates depth-map renderings of the second set of photo-realistic frames of FIG. 5A. Frames 552*a*, 552*b*, and 552*c* of FIG. 5B represent 3D image data/datasets that correspond to 2D frames 502*a*, 502*b*, and 502*c*, respectively. Depth-map renderings illustrated by frames 552*a*, 552*b*, and 552*c* depict 3D images having 3D image data/datasets, of the vehicle storage area 102*s* docked at the docking bay 102*d* of FIG. 2A where the storage area includes a detected package wall (e.g., package wall 560*a*, 560*b*, or 560*c*). Frames 552*a*, 552*b*, and 552*c* include depth-map renderings rendered as 3D images as captured, for example, by 3D-depth camera 254 of TMU 202. Depth-map renderings of frames 552*a*, 552*b*, and 552*c* may include 3D image data/datasets, such as depth values determined from a depth-map as described herein. The 3D image data may be point cloud data, where the point cloud data is associated with various color pixel values based on depths of the data points within depth-map renderings of frames 452*a* and 452*b* as described herein. For example, point cloud data may include a set of data points that can represent depth, distances, and the 3D shape of surfaces or objects scanned by a 3D-depth camera. It is to be understood that the disclosure with respect to the depth-map renderings, related frames, images, views, data/datasets, or otherwise as disclosed for FIG. 4B applies equally herein for the depth-map renderings and related frames, images, views, data/datasets, or otherwise of FIG. 5B.

Depth-map renderings of frames 552*a*, 552*b*, and 552*c* include the same or similar surfaces and objects as photo-realistic views of frames 502*a*, 502*b*, and 502*c*, except the depth-map rendering of frames 552*a*, 552*b*, and 552*c* represent such surfaces and objects via 3D imagery and/or data. For example, depth-map renderings of frames 552*a*, 552*b*, and 552*c* include package walls 560*a*, 560*b*, and 560*c* that correspond to package walls 510*a*, 510*b*, and 510*c* (but are represented in via 3D imagery and/or data). For example, as for package walls 510*a*, 510*b*, and 510*c* of photo-realistic views of frames 502*a*, 502*b*, and 502*c*, package walls 510*a*, 510*b*, and 510*c* of depth-map renderings of frames 552*a*, 552*b*, and 552*c* are also located at the rear section of the vehicle storage area 102*s*. Similarly, vehicle storage area 102*s*, of Depth-map renderings of frames 552*a*, 552*b*, and 552*c*, is defined by surface areas including left wall 556*la*/556*lb*/556*lc*, and floor area 554*a*/554*b*/554*c* of depth-map renderings of frames 552*a*, 552*b*, and 552*c*, which correspond to left wall 506*la*/506*lb*/506*lc*, and floor area 504*a*/504*b*/504*c* of photo-realistic views of frames 502*a*, 502*b*, and 502*c*.

Depth-map renderings of frames 552*a*, 552*b*, and 552*c* represent various depth values of the 3D image data via different color pixel values. For example, frame 552*a* depicts an embodiment of a point cloud rendering of the vehicle storage area 102*s*, where the points of the point cloud are colored based on z-axis depth and define a 3D image before a person enters the vehicle storage area. Similarly, frame 552*b* depicts an embodiment of a point cloud rendering of the vehicle storage area 102*s*, where the points of the point cloud are colored based on z-axis depth, but person 570*b* (also rendered in point cloud data) has entered the vehicle storage area (as similarly described for corresponding RGB frame 502*b*, where person 570*b* corresponds to person 520*b*, both in RGB and point cloud renderings, respectively). Frame 552*c* depicts an embodiment of a point cloud rendering of the vehicle storage area 102*s*, where the points of the point cloud are colored based on z-axis depth, but where the person has exited the vehicle storage area (as similarly described for corresponding RGB frame 502*c*). FIG. 5B is rendered via the same rendering scheme (e.g., the distance of objects or surfaces are delimited via corresponding different colors) as described for 4B. It is to be understood that the coloring/distance scheme described for FIG. 4B applies equally for FIG. 5B, and for each of the depth-map renderings of frames 552*a*, 552*b*, and 552*c*, as described herein.

As further shown in depth-map renderings of frames 552*a*, 552*b*, and 552*c*, each of packages 562*a*/562*b*/562*c* and packages 564*a*/564*b*/564*c* are depicted with red, orange and/or yellow-based depth values (e.g., near distances) from the 3D-depth camera (e.g., 3D-depth camera 254). Floor areas 554*a*/554*b*/554*c*, package walls 560*a*/560*b*/560*c* are depicted in green depth values (e.g., far distances) from the 3D-depth camera (e.g., 3D-depth camera 254). Floor areas 554*a*/554*b*/554*c* of FIG. 5B correspond to floor areas 504*a*/504*b*/504*c* of FIG. 5A, packages 562*a*/562*b*/562*c* of FIG. 5B correspond to packages 512*a*/512*b*/512*c* of FIG. 5A, and packages 564*a*/564*b*/564*c* of FIG. 5B correspond to packages 514*a*/514*b*/514*c* of FIG. 5A. Person 570*b* of FIG. 5B corresponds to person 520*b* of FIG. 5A.

Figure 6:
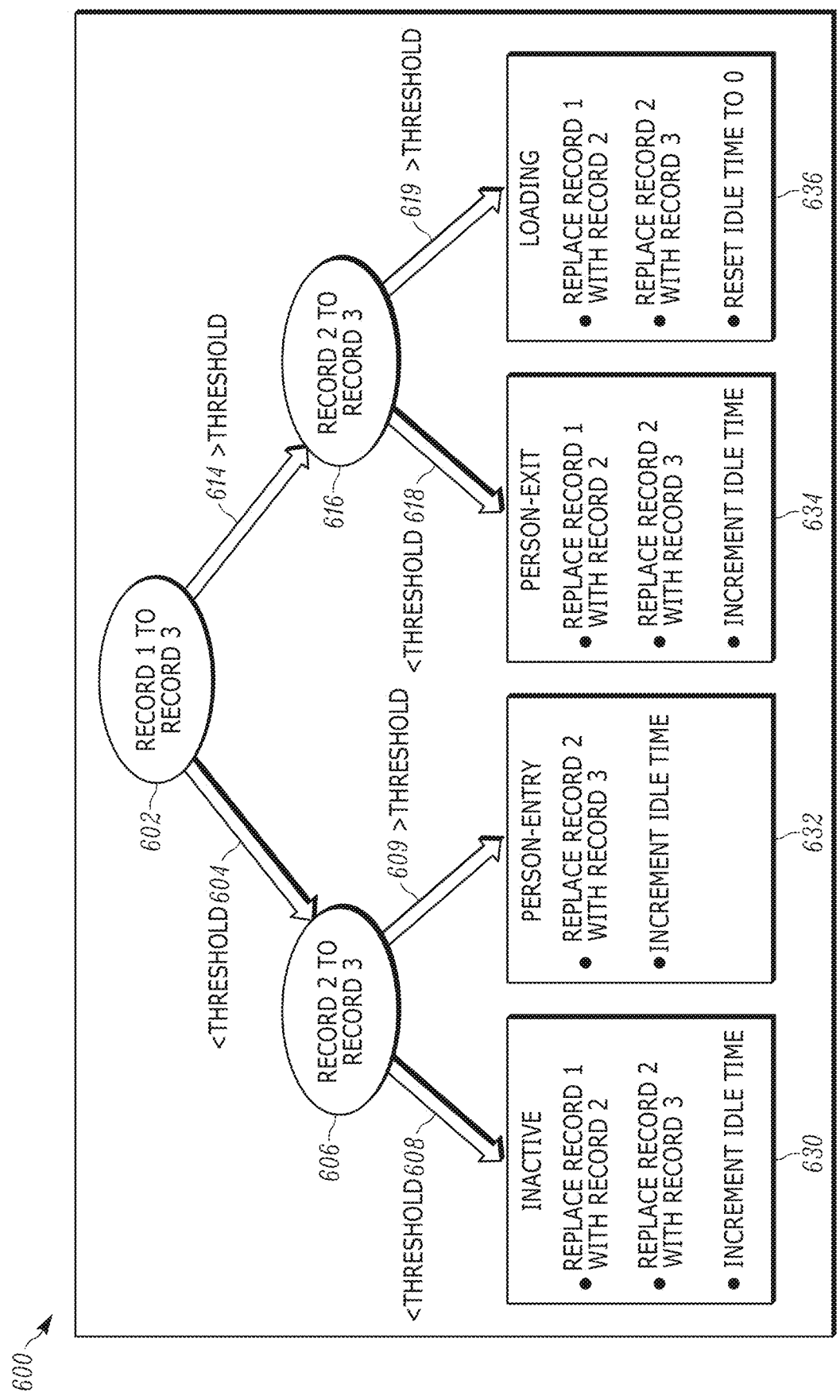
FIG. 6 is a flow chart of a three-dimensional (3D) imaging method for analyzing idle time duration in a storage area.

FIG. 6 is a flow chart of a three-dimensional (3D) imaging method 600 for analyzing idle time duration in a storage area. The example flow chart of FIG. 6 is represented as a binary decision tree algorithm that may be implemented by one or more processor(s) (e.g., any of one or more processors of TMU 202, server 301, and/or of a client device) to determine idle time durations, e.g., from analyzing point cloud differences. Method 600 (e.g., binary decision tree algorithm) may be implemented across numerous iterations to determine the idle time duration (e.g., increment a cumulative idle time duration as described herein). While FIG. 6 is illustrated as a binary decision tree algorithm, it is to be understood that different or other algorithms may be utilized to achieve the analysis of idle time duration in a storage area as described herein.

Method 600 includes non-concurrently capturing, via a 3D-depth camera (e.g., TMU 202), frames (e.g., as represented by each of Record 1, Record 2, and Record 3), each having a respective 3D image dataset. That is, as illustrated in FIG. 6, various records (e.g., Record 1, Record 2, and Record 3) may be compared (blocks 602, 606, 616) via the binary decision tree algorithm. In various embodiments, method 600 may be implemented in real-time (e.g., images are analyzed/compared as they are captured). As used herein, the term non-concurrent or non-concurrent frames shall refer to frames that were captured at different times.

Each of the records may correspond to frames each having a respective 3D image dataset (e.g., frames 452*a* and 452*b* of FIG. 4B and/or frames 552*a*, 552*b*, 552*c* of FIG. 5B). Each of the frames/3D image datasets may have been captured by TMU 202 as described herein. Accordingly, in various embodiments, as exemplified in FIG. 6, a 3D data analytics application (app) executing on one or more processors may maintain a plurality of records including a first record (e.g., Record 1), a second record (e.g., Record 2), and a third record (Record 3). In some embodiments, an association between each of the plurality of records (e.g., Record 1, Record 2, and Record 3) and the respective 3D image dataset of a respective frame may include a respective frame buffer storing the respective 3D image dataset of the respective frame, where each of the respective frame buffer is stored in a 3D imaging system memory (e.g., maintained in a computer memory of TMU 202, server 301, and/or client device 204). In various embodiments, the plurality of records (e.g., Record 1, Record 2, and Record 3) is implemented so as to form an array of records in memory.

In various embodiments, each 3D image dataset may include a respective point cloud. In such embodiments, the 3D data analytics app may be further configured to perform the first comparison 602 between the third record (e.g., Record 3) and the first record (e.g., Record 1) by comparing at least a portion of the respective point cloud of the 3D image dataset associated with at least a portion of the third record (e.g., Record 3) with the respective point cloud of the 3D image dataset associated with the first record (e.g., Record 1). For example, once two 3D image datasets (e.g., point clouds) are stored as respective records, each subsequent 3D image dataset (e.g., point cloud) may be compared against both 3D image datasets (e.g., point clouds) in the records using, e.g., a point cloud library (e.g., Octree library) to extract the points that are in one 3D image dataset (e.g., point cloud) but not the other. This number of points is then compared to an empirically determined threshold values as described herein. Depending on how the point differences compare, different actions (e.g., incrementing cumulative idle time duration or resetting cumulative idle time duration) may be taken, as illustrated in the binary decision tree of FIG. 6. These courses of actions allow for the detection of package movement (e.g., as illustrated in FIGS. 4A and 4B), which may account for loading activity, and/or the detection of a person walking in (e.g., person-entry) and back out again (e.g., person-exit) as illustrated in FIGS. 5A and 5B, which may account for non-loading activity.

In various embodiments, the first record (e.g., Record 1) may be associated with a 3D image dataset of a least-recent frame in a series of frames. The third record (e.g., Record 3) may be associated with a 3D image dataset of a most-recent frame in the series of frames. The second record (e.g., Record 2) may be associated with a 3D image dataset of an intermediate frame. The intermediate frame (e.g., represented by Record 2) may have been captured between the least-recent frame (e.g., represented by Record 1) in the series of frames and the most-recent frame (e.g., represented by Record 3) in the series of frames. In some embodiments, a series of frames may be limited to three frames (e.g., three frames associated with Record 1, Record 2, and Record 3, respectively).

At block 602, method 600 may begin by performing (e.g., via any of one or more processors of TMU 202, server 301, and/or of a client device) a first comparison 602 between the third record (e.g., Record 3) and the first record (e.g., Record 1) to determine if a difference between the 3D image dataset associated with the third record (e.g., Record 3) and the 3D image dataset associated with the first record (e.g., Record 1) is less than or greater than a first threshold value. As used herein, the term threshold value shall refer to a value determined from comparison of 3D image datasets (e.g., point cloud data), for example, where locations, distances, and/or otherwise metrics, of points of one 3D image dataset 3D of one record (e.g., Record 1) are compared for differences between locations, distances, and/or otherwise metrics of another 3D image dataset 3D of a second record (e.g., Record 3). For example, in some embodiments, a determination of whether or not package loading has occurred may be performed by analyzing the difference between two consecutive data frames (e.g., between frames 452*a* and 452*b* of FIG. 4B and/or frames 552*a*, 552*b*, 552*c* of FIG. 5B). Each data frame may be represented as a point cloud, e.g., a 3D image where each point represents an x, y, and z coordinate in space, as represented, for example, by depth-map renderings of the frames of FIGS. 4B and 5B. To determine changes between two frames, a point-to-point search may occur, where for every point in a first point cloud (e.g., which could be defined by Record 1), an algorithm checks if there is a substantially or exactly matching point in a second different point cloud (e.g., which could be defined by Record 3). Once the number of unmatched points reaches above a certain threshold (e.g., a threshold value), the images are considered to be significantly different (e.g., indicating that a change of objects/surfaces in the vehicle storage area had occurred between two frames—for example, between frames 452*a* and 452*b* of FIG. 4B and/or frames 552*a*, 552*b*, 552*c* of FIG. 5B).

If the first comparison 602 yields a difference value less than the first threshold value (branch 604), then, method 600 includes performing a second comparison 606 between the third record (e.g., Record 3) and the second record (e.g., Record 2) to determine if a difference between the 3D image dataset associated with the third record (e.g., Record 3) and the 3D image dataset associated with the second record (e.g., Record 3) is less than or greater than a second threshold value.

However, if the first comparison 602 yields a difference value greater than (or, in some embodiments, equal to) the first threshold value (branch 614), then, method 600 includes performing a second comparison 616 between the third record (e.g., Record 3) and the second record (e.g., Record 2) to determine if a difference between the 3D image dataset associated with the third record (e.g., Record 3) and the 3D image dataset associated with the second record (e.g., Record 3) is less than or greater than the second threshold value.

Regardless of whether second comparison 606 or second comparison 616 is performed, method 600 includes determining (e.g., via any of one or more processors of TMU 202, server 301, and/or of a client device), and based on the first comparison 602 and the second comparison (e.g., either second comparison 606 or second comparison 616), an activity status type (e.g., any of an inactive status type 630, a person-entry status type 632, a person-exit status type 634, or a loading status type 636) defining an activity occurring within the storage area during a time segment. In such embodiments, the time segment occurs between a time of capture of the least-recent frame in the series of frames (e.g., the frame associated with Record 1) and a time of capture of the most-recent frame in the series of frames (e.g., the frame associated with Record 3).

The activity status type may include various statuses, including status types categorized as non-loading status types and status types categorized as loading status types. It is to be understood that while various example status types are disclosed and describe herein, the totality of status types contemplated herein are not limited to the example types disclosed. By way of example, the activity status type may include, but is not limited to, loading status type 636. The activity status type may be determined to have the loading status type 636 when the first comparison 602 indicates that the difference between the 3D image dataset associated with the third record (e.g., Record 3) and the 3D image dataset associated with the first record (e.g., Record 1) is greater than the first threshold value (branch 614), and the second comparison 616 indicates that the difference between the 3D image dataset associated with the third record (e.g., Record 3) and the 3D image dataset associated with the second record (e.g., Record 2) is greater than the second threshold value (branch 619).

In general, detecting loading activity involves analyzing 3D image datasets (e.g., 3D image datasets of frames 452a and 452b) to determine that only the movement of packages is detected (e.g., as illustrated via FIGS. 4A and 4B), and not the entrance/exit of a person (e.g., as illustrated via FIGS. 5A and 5B). For example, FIGS. 4A and 4B illustrate that packages 414a/464a have moved or changed position (e.g., via packages 416b/466b), as determined via 3D image data, thus indicating to a processor (analyzing the 3D image data as described herein) that loading activity has occurred. In this way, a processor may analyze the history of recent 3D image data (e.g., point clouds) to check if a change in the 3D image data (e.g., point clouds) with respect to package location remains permanent (e.g., indicating that packages 416b/466b have moved as illustrated in FIGS. 4A and 4B). This is in contrast to non-loading activity, where 3D image data (e.g., point cloud data) may indicate e.g., that a person has entered/exited as illustrated in FIGS. 5A and 5B.

In some embodiments, the 3D data analytics app may be configured to reset, based on the activity status type having a loading status type, the cumulative idle time duration. For example, as indicated in FIG. 6, loading status type 636 may cause the idle time to be reset, because, loading activity was detected via the 3D image dataset, and thus the loading of the vehicle storage area was ongoing (and not idle). Resetting the idle time to zero allows for the system, in across various iterations, to take into account a point of reference for when non-idle time was experienced. Thus, loading activity nullifies, or zeroes out, an idle time that would otherwise be incremented the cumulative idle time duration for a non-activity status type.

For example, in other embodiments, the activity status type may include non-loading status types. Non-loading status types may include, but are not limited to, any one of inactive status type 630, person-entry status type 632, and person-exit status type 634. For example, the images or frames of FIGS. 5A and 5B may be associated with person-entry status type 632 and/or person-exit status type 634. Each of the non-loading status types causes the cumulative idle time duration to be incremented because no loading activity is determined to be taking place (e.g., determined via 3D image analysis as described herein). For example, in various embodiments, the activity status type may be determined to have inactive status type 630 when the first comparison 602 indicates that the difference between the 3D image dataset associated with the third record (e.g., Record 3) and the 3D image dataset associated with the first record (e.g., Record 1) is less than the first threshold value (branch 604), and the second comparison 606 indicates that the difference between the 3D image dataset associated with the third record (e.g., Record 3) and the 3D image dataset associated with the second record (e.g., Record 2) is less than the second threshold value (branch 608).

Similarly, in additional embodiments, the activity status type may be determined to have the person-entry status type 632 when the first comparison 602 indicates that the difference between the 3D image dataset associated with the third record (e.g., Record 3) and the 3D image dataset associated with the first record (e.g., Record 1) is less than the first threshold value (branch 604), and the second comparison indicates that the difference between the 3D image dataset associated with the third record (e.g., Record 3) and the 3D image dataset associated with the second record (e.g., Record 2) is greater than the second threshold value (branch 609).

In further embodiments, the activity status type may be determined to have the person-exit status type 634 when the first comparison 602 indicates that the difference between the 3D image dataset associated with the third record (e.g., Record 3) and the 3D image dataset associated with the first record (e.g., Record 1) is greater than the first threshold value (branch 614), and the second comparison 616 indicates that the difference between the 3D image dataset associated with the third record (e.g., Record 3) and the 3D image dataset associated with the second record (e.g., Record 2) is less than the second threshold value (branch 618).

As indicated in FIG. 6, the 3D data analytics app may be configured to adjust or replace various records (e.g., Record 1 and Record 2), upon determining the activity status type has any one of (i) inactive status type 630, (ii) person-exit status type 634, or (iii) loading status type 636. For example, upon the determination of any of the status types 630, 634, or 636, the 3D analytics app may adjust the series of frames by removing the least-recent frame (e.g., represented by Record 1) from the series of frames causing the intermediate frame (e.g., represented by Record 2) to become the least-recent frame in the series of frames (e.g., replace Record 1 with Record 2). In such embodiments, a new frame may be added as captured subsequent to the most-recent frame in the series of frames, causing the most-recent frame (e.g., represented by Record 3) to become the intermediate frame (e.g., replace Record 2 with Record 3).

As indicated in FIG. 6, in additional embodiments, 3D data analytics app may be configured to adjust or replace certain records (e.g., Record 2), upon determining the activity status type has the person-entry status type 632. In such embodiments, the 3D analytics app may adjust the series of frames by maintaining the least-recent frame in the series of frames (e.g., as represent by Record 1), and adding a new frame, captured subsequent to the most-recent frame in the series of frames, to the series of frames causing the most-recent frame (e.g., Record 3) to become the intermediate frame (e.g., replace Record 2 with Record 3).

In some embodiments, the 3D data analytics app is may be further configured to pre-process each of the plurality of records (e.g., Record 1, Record 2, and Record 3) prior to perform the first comparison and the second comparison. In such embodiments, pre-processing may include cropping at least a portion of the respective 3D image dataset of a respective frame associated with each of the plurality of records. For example, before 3D image datasets (e.g., point clouds) can be processed, such 3D image datasets may need to be cropped to reduce the effect of light leakage which causes stray data points. Otherwise, the change in points between two different 3D image datasets (e.g., point clouds) may originate from outliers, not real data.

During various iterations, method 600 may include incrementing, based on the activity status type having a non-loading status type, a cumulative idle time duration. For example, iterations involving an inactive status type 630, a person-entry status type 632, or a person-exit activity type 634 may each cause the cumulative idle time duration to be incremented. In some embodiments, the cumulative idle time duration is a duration of time during in which (i) no item is brought into the storage area, (ii) no item is removed from the storage area, and (iii) no item is moved from one location to another location within the storage area. For example, each of these activities may be represented, for example, by the inactive status type 630 of FIG. 6.

In similar embodiments, the activity status type may be determined to have a non-loading status type when the first comparison (602) indicates that the difference between the 3D image dataset associated with the third record (e.g., Record 3) and the 3D image dataset associated with the first record (e.g., Record 1) is less than the first threshold value, such that, as shown by FIG. 6, the activity status type is one of either the inactive status type 630 (branch 608) or the person-entry status type 632 (branch 609), where both types 630 and 632 are non-loading status types.

In additional embodiments, the activity status type may be determined to have a non-loading status type when the first comparison 602 indicates that the difference between the 3D image dataset associated with the third record (e.g., Record 3) and the 3D image dataset associated with the first record (e.g., Record 1) is greater than the first threshold value (614), and the second comparison (616) indicates that the difference between the 3D image dataset associated with the third record (e.g., Record 3) and the 3D image dataset associated with the second record (e.g., Record 2) is less than the second threshold value (branch 618).

In addition, during various iterations, method 600 may further include providing, via a computer network, the cumulative idle time duration to a computing device having a computing device memory. For example, in some embodiments, the computing device is any of a client device (e.g., client device 204) or a server (e.g., server 301) configured to manage a plurality of client devices. In such embodiments, a manager or other employee overseeing the loading of packages/parcels in a vehicle storage area (e.g., vehicle storage area 102*s*) may use the cumulative idle time duration (e.g., in real-time) to improve the operational efficiency and/or or loading regimen associated with logistical operations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A three-dimensional (3D) imaging system configured to analyze idle time duration in a storage area, the 3D imaging system comprising:
   a 3D-depth camera configured to non-concurrently capture frames each having a respective 3D image dataset; and
   a 3D data analytics application (app) executing on one or more processors, the 3D data analytics app configured to:
      maintain a plurality of records including a first record, a second record, and a third record, the first record being associated with a 3D image dataset of a least-recent frame in a series of frames, the third record being associated with a 3D image dataset of a most-recent frame in the series of frames, and the second record being associated with a 3D image dataset of an intermediate frame, the intermediate frame being captured between the least-recent frame in the series of frames and the most-recent frame in the series of frames;
      perform a first comparison between the third record and the first record to determine if a difference between the 3D image dataset associated with the third record and the 3D image dataset associated with the first record is less than or greater than a first threshold value;
      perform a second comparison between the third record and the second record to determine if a difference between the 3D image dataset associated with the third record and the 3D image dataset associated with the second record is less than or greater than a second threshold value;
      determine, based on the first comparison and the second comparison, an activity status type defining an activity occurring within the storage area during a time segment, the time segment occurring between a time of capture of the least-recent frame in the series of frames and a time of capture of the most-recent frame in the series of frames;
      increment, based on the activity status type having a non-loading status type, a cumulative idle time duration; and
      provide, via a computer network, the cumulative idle time duration to a computing device having a computing device memory.

2. The 3D imaging system of claim 1, wherein the cumulative idle time duration is a duration of time during which (i) no item is brought into the storage area, (ii) no item is removed from the storage area, and (iii) no item is moved from one location to another location within the storage area.

3. The 3D imaging system of claim 1, wherein an association between each of the plurality of records and the respective 3D image dataset of a respective frame includes a respective frame buffer storing the respective 3D image dataset of the respective frame, each of the respective frame buffer being stored in a 3D imaging system memory.

4. The 3D imaging system of claim 1, wherein the plurality of records forms an array of records.

5. The 3D imaging system of claim 1, wherein the 3D data analytics app is further configured to pre-process each of the plurality of records prior to perform the first comparison and the second comparison, wherein the pre-processing includes cropping at least a portion of the respective 3D image dataset of a respective frame associated with each of the plurality of records.

6. The 3D imaging system of claim 1, wherein each of the respective 3D image dataset includes a respective point cloud.

7. The 3D imaging system of claim 6, wherein the 3D data analytics app is further configured to perform the first comparison between the third record and the first record by comparing at least a portion of the respective point cloud of the 3D image dataset associated with at least a portion of the third record with the respective point cloud of the 3D image dataset associated with the first record.

8. The 3D imaging system of claim 1, wherein the activity status type having the non-loading status type is determined when:
   (i) the first comparison indicates that the difference between the 3D image dataset associated with the third record and the 3D image dataset associated with the first record is less than the first threshold value; or
   (ii) the first comparison indicates that the difference between the 3D image dataset associated with the third record and the 3D image dataset associated with the first record is greater than the first threshold value, and the second comparison indicates that the difference between the 3D image dataset associated with the third record and the 3D image dataset associated with the second record is less than the second threshold value.

9. The 3D imaging system of claim 1, wherein:
   the activity status type further includes a loading status type;
   the non-loading status type includes any one of (i) an inactive status type, (ii) a person-entry status type, and (iii) a person-exit status type;
   the activity status type is determined to have the loading status type when the first comparison indicates that the difference between the 3D image dataset associated with the third record and the 3D image dataset associated with the first record is greater than the first threshold value, and the second comparison indicates that the difference between the 3D image dataset associated with the third record and the 3D image dataset associated with the second record is greater than the second threshold value;

the activity status type is determined to have the inactive status type when the first comparison indicates that the difference between the 3D image dataset associated with the third record and the 3D image dataset associated with the first record is less than the first threshold value, and the second comparison indicates that the difference between the 3D image dataset associated with the third record and the 3D image dataset associated with the second record is less than the second threshold value;

the activity status type is determined to have the person-entry status type when the first comparison indicates that the difference between the 3D image dataset associated with the third record and the 3D image dataset associated with the first record is less than the first threshold value, and the second comparison indicates that the difference between the 3D image dataset associated with the third record and the 3D image dataset associated with the second record is greater than the second threshold value; and the activity status type is determined to have the person-exit status type when the first comparison indicates that the difference between the 3D image dataset associated with the third record and the 3D image dataset associated with the first record is greater than the first threshold value, and the second comparison indicates that the difference between the 3D image dataset associated with the third record and the 3D image dataset associated with the second record is less than the second threshold value.

10. The 3D imaging system of claim 9, where the 3D data analytics app is further configured to:

upon determining the activity status type as having any one of (i) the inactive status type, (ii) the person-exit status type, and (iii) the loading status type:
adjust the series of frames by removing the least-recent frame from the series of frames causing the intermediate frame to become the least-recent frame in the series of frames, and adding a new frame, captured subsequent to the most-recent frame in the series of frames, to the series of frames causing the most-recent frame to become the intermediate frame; and upon determining the activity status type as having the person-entry status type, to:
adjust the series of frames by maintaining the least-recent frame in the series of frames, and adding the new frame, captured subsequent to the most-recent frame in the series of frames, to the series of frames causing the most-recent frame to become the intermediate frame.

11. The 3D imaging system of claim 10, wherein the series of frames is limited to three frames.

12. The 3D imaging system of claim 1, wherein the 3D data analytics app is further configured to reset, based on the activity status type having a loading status type, the cumulative idle time duration.

13. The 3D imaging system of claim 1, wherein the computing device is at least one of a client device and a server configured to manage a plurality of client devices.

14. A three-dimensional (3D) imaging method for analyzing idle time duration in a storage area, the 3D imaging method comprising:

non-concurrently capturing, via a 3D-depth camera, frames each having a respective 3D image dataset;
maintaining, via 3D data analytics application (app) executing on one or more processors, a plurality of records including a first record, a second record, and a third record, the first record being associated with a 3D image dataset of a least-recent frame in a series of frames, the third record being associated with a 3D image dataset of a most-recent frame in the series of frames, and the second record being associated with a 3D image dataset of an intermediate frame, the intermediate frame being captured between the least-recent frame in the series of frames and the most-recent frame in the series of frames;

performing a first comparison between the third record and the first record to determine if a difference between the 3D image dataset associated with the third record and the 3D image dataset associated with the first record is less than or greater than a first threshold value;

performing a second comparison between the third record and the second record to determine if a difference between the 3D image dataset associated with the third record and the 3D image dataset associated with the second record is less than or greater than a second threshold value;

determining, based on the first comparison and the second comparison, an activity status type defining an activity occurring within the storage area during a time segment, the time segment occurring between a time of capture of the least-recent frame in the series of frames and a time of capture of the most-recent frame in the series of frames;

incrementing, based on the activity status type having a non-loading status type, a cumulative idle time duration; and providing, via a computer network, the cumulative idle time duration to a computing device having a computing device memory.

15. The 3D imaging method of claim 14, wherein the cumulative idle time duration is a duration of time during which (i) no item is brought into the storage area, (ii) no item is removed from the storage area, and (iii) no item is moved from one location to another location within the storage area.

16. The 3D imaging method of claim 14, wherein an association between each of the plurality of records and the respective 3D image dataset of a respective frame includes a respective frame buffer storing the respective 3D image dataset of the respective frame, each of the respective frame buffer being stored in a 3D imaging system memory.

17. The 3D imaging method of claim 14, wherein the plurality of records forms an array of records.

18. The 3D imaging method of claim 14, wherein the 3D data analytics app is further configured to pre-process each of the plurality of records prior to perform the first comparison and the second comparison, wherein the pre-processing includes cropping at least a portion of the respective 3D image dataset of a respective frame associated with each of the plurality of records.

19. The 3D imaging method of claim 14, wherein each of the respective 3D image dataset includes a respective point cloud.

20. The 3D imaging method of claim 19, wherein the 3D data analytics app is further configured to perform the first comparison between the third record and the first record by comparing at least a portion of the respective point cloud of the 3D image dataset associated with at least a portion of the third record with the respective point cloud of the 3D image dataset associated with the first record.

* * * * *